(12) United States Patent
Barton et al.

(10) Patent No.: US 7,256,938 B2
(45) Date of Patent: Aug. 14, 2007

(54) METHOD FOR MAKING LARGE SCALE MULTILAYER DIELECTRIC DIFFRACTION GRATINGS ON THICK SUBSTRATES USING REACTIVE ION ETCHING

(75) Inventors: Ian Michael Barton, San Diego, CA (US); Michael Dale Perry, Poway, CA (US)

(73) Assignee: General Atomics, San Diego, CA (US)

( * ) Notice: Subject to any disclaimer, the term of this patent is extended or adjusted under 35 U.S.C. 154(b) by 321 days.

(21) Appl. No.: 11/083,689

(22) Filed: Mar. 17, 2005

(65) Prior Publication Data

US 2005/0231806 A1    Oct. 20, 2005

Related U.S. Application Data

(60) Provisional application No. 60/554,224, filed on Mar. 17, 2004.

(51) Int. Cl.
*G02B 5/18* (2006.01)
(52) U.S. Cl. .................. 359/576; 359/566; 359/569; 359/587; 372/102
(58) Field of Classification Search ............. 359/566, 359/568–576, 584, 587; 372/102
See application file for complete search history.

(56) References Cited

U.S. PATENT DOCUMENTS

| | | | |
|---|---|---|---|
| 4,281,894 A * | 8/1981 | Guha .................. 359/572 |
| 4,313,648 A | 2/1982 | Yano et al. |
| 4,426,440 A | 1/1984 | Thompson |
| 4,895,790 A * | 1/1990 | Swanson et al. ............ 430/321 |
| 4,915,463 A | 4/1990 | Barbee, Jr. |
| 5,119,231 A * | 6/1992 | Nelson et al. ............... 359/359 |
| 5,254,202 A * | 10/1993 | Kaplan .................... 156/345.1 |
| 5,296,091 A | 3/1994 | Bartha et al. |
| 5,510,215 A * | 4/1996 | Prince et al. ................... 430/7 |
| 5,907,436 A * | 5/1999 | Perry et al. .................. 359/576 |
| 6,476,968 B1 * | 11/2002 | Kato et al. ................... 359/565 |
| 6,671,092 B2 * | 12/2003 | Flatscher .................... 359/436 |
| 6,775,066 B2 * | 8/2004 | Kurisu et al. ............... 359/576 |
| 6,822,796 B2 * | 11/2004 | Takada et al. ............... 359/569 |

* cited by examiner

*Primary Examiner*—Leonidas Boutsikaris
(74) *Attorney, Agent, or Firm*—Fitch, Even, Tabin & Flannery (57) ABSTRACT

Methods of fabricating large size, high performance multilayer diffraction gratings having a thick substrate that take advantage of reactive ion etching during the fabrication process are provided herein. In one implementation, a method of making a multilayer diffraction grating comprises the steps of: providing a substrate having a thickness of at least 2.0 cm; applying a dielectric structure having a plurality of layers on the substrate; depositing a photoresist; exposing the photoresist to a grating pattern; developing the photoresist to produce the grating pattern in the photoresist; and reactive ion etching to transfer the grating pattern to the dielectric structure. In preferred form, the substrate material of the grating is selected to have low electrical resistivity and high thermal conductivity.

21 Claims, 5 Drawing Sheets

METHOD FOR MAKING LARGE SCALE MULTILAYER DIELECTRIC DIFFRACTION GRATINGS ON THICK SUBSTRATES USING REACTIVE ION ETCHING

This application claims the benefit of U.S. Provisional Application No. 60/554,224, filed Mar. 17, 2004, which is incorporated herein by reference.

BACKGROUND OF THE INVENTION

1. Field of the Invention

The present invention relates generally to diffraction gratings, and more specifically to the manufacture of multilayer diffraction gratings.

2. Discussion of the Related Art

Diffraction gratings are integral parts of chirped-pulse amplification (CPA) high peak power lasers. In this scheme, high peak power is achieved by creating a laser pulse which contains an energy density near the saturation fluence of the laser medium and a duration near the inverse of its gain narrowed bandwidth. Diffraction gratings are used to distribute the energy of the laser pulse over a much longer time period prior to amplification in order to prevent damage to the laser amplifier. Following amplification, the pulse is compressed to extremely high power density by passage through a pulse compressor based on diffraction gratings. Diffraction gratings are the limiting factor to the power achievable with these systems, since a final grating must withstand this high power density in order to reform the short pulse. Therefore, for future higher power and energy laser systems it is desirable to both increase the size (area) and damage threshold of the gratings. The metallic diffraction gratings that were used in the world's most powerful laser system, the petawatt, were required to be nearly one square meter in area in order to handle the laser power. Lasers with increasing power and energy levels are required for many important experiments in high energy density physics and inertial confinement fusion.

Prior art designs and fabrication methods for advanced gratings that use non-metallic materials have inherently higher laser damage threshold that prior metallic gratings. For example, in U.S. Pat. No. 4,915,463 (which is incorporated herein by reference), Barbee, Jr., a fabrication method for a grating of this type is described where the grating pattern is etched into a bulk substrate, prior to the coating of a reflecting dielectric multilayer on the surface. This grating is impractical for the CPA application since the high efficiency and large chromatic bandwidth required for the CPA application means that the multilayer would have to contain many layers (>20) to have high reflectivity. This large number of layers will act to planarize the patterned surface, destroying the grating structure. In U.S. Pat. No. 5,119,231 (which is incorporated herein by reference), Nelson et al. describe an etching step, with a planarization layer of different refractive index before applying a multilayer coating to the surface. This solution would also not be applicable due to many reasons. The planarization layer will cause additional evanescent losses for the diffraction grating limiting the efficiency. Also, the incident beam would have to travel through the substrate, which is not practical for short, high peak power pulses due to the potential for damage to the substrate resulting from self-focusing.

In U.S. Pat. No. 5,907,436 (which is incorporated herein by reference), Perry et al. provide a multilayer grating that is designed specifically for the pulse-compression grating application. A grating pattern is formed in the top layer of a multilayer dielectric coating that has high reflectivity. The multilayer dielectric coating is formed on an insulating substrate. Perry et al. suggest a large number of fabrication options, including dry etching, wet etching and lift-off processing. Furthermore, U.S. Pat. No. 4,313,648 (Yano et al.) and U.S. Pat. No. 5,510,215 (Prince et al.) (both of which are incorporated herein by reference) describe the patterning of multilayer dielectric stripe filters including fabrication methods for producing patterned dielectric multilayer stacks using dry etching.

According to known fabrication techniques for multilayer diffraction gratings, insulating materials, such as fused silica (glass), are predominantly used as the substrate material upon which the multilayer dielectric structure is attached. Such materials provide good insulating properties and good adherence to the oxide dielectric layers formed thereon.

Figure 1:
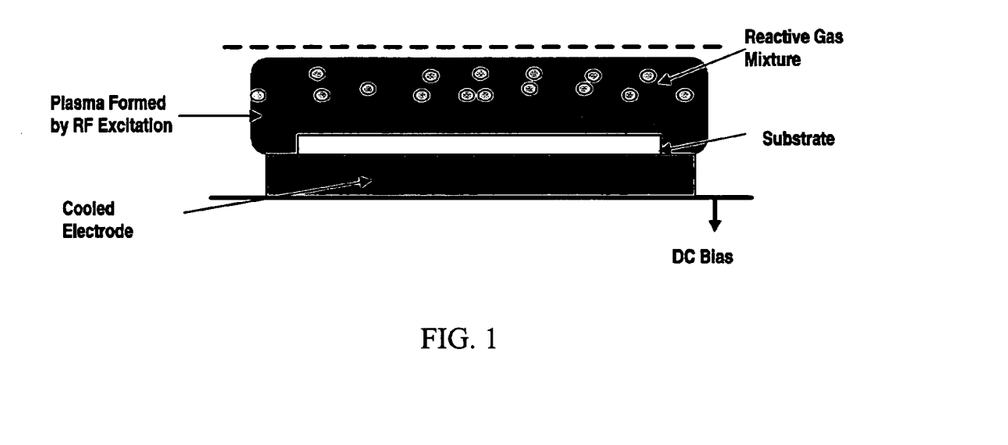
FIG. 1 is a simplified diagram of reactive ion etching as is conventionally known.

The primary fabrication choice for the patterning of multilayer dielectrics, such as described in the Perry, Yano and Prince patents above, is dry etching, notably reactive ion etching (RIE). Reactive-ion etching is favored over many different etch methods due to its high selectivity and anisotropic characteristics. As illustrated in FIG. 1, in reactive ion etching, a plasma excites gases that chemically attack the target material. Ions within the plasma are accelerated towards the substrate by a DC bias voltage applied at the bottom of the substrate. These ions can excite or ionize other species which then chemically react with the substrate or, they can attack the substrate directly. It is the combination of chemical and physical processes that gives RIE high anisotropy and selectivity.

However, large gratings (to satisfy the requirements of high peak power laser systems) require that the substrate is thick due to the desire to maintain wavefront quality of the gratings. This is due to stresses in the coating or even the weight of the substrate itself being able to deform the substrate to an extent that it is unusable unless the thickness of the substrate is sufficient to prevent this distortion. A typical aspect ratio that is used for the maximum width of the substrate compared to the thickness is 6:1. Hence, gratings of sizes greater than 40 cm in width, would be required to be greater than 6.5 cm thick to satisfy this criterion.

Descriptions of diffraction gratings and methods to fabricate them, such as described in the Perry, Yano and Prince patents, do not consider the thickness of the substrate material. For small-size gratings in which the thickness of the substrate is inherently thin (less than 0.5 cm) and for gratings fabricated with ion-beam etching processes, the substrate thickness is not important, However, reactive ion etching has proven challenging in the fabrication of large size multilayer diffraction gratings in which the substrate is thick, e.g., at least 2.0 cm. Accordingly, instead of using reactive ion etching, such diffraction gratings are typically fabricated using ion beam etching, which uses a focused ion beam to directly ablate the target surface.

In one approach, such as described in U.S. Pat. No. 5,296,091 to Bartha et al. (which is incorporated herein by reference), the etching of substrates having a low thermal conductivity is improved by providing a cooling apparatus to remove the excess heat generated at the substrate in order to minimize non-uniform heating effects.

SUMMARY OF THE INVENTION

Several embodiments of the invention advantageously address the needs above as well as other needs by providing fabrication techniques including the selection of materials to manufacture large size, high performance multilayer diffraction gratings having a thick substrate that take advantage of reactive ion etching during the fabrication process.

In one embodiment, the invention may be characterized as a method of making a multilayer diffraction grating comprising the steps of: providing a substrate having a thickness of at least 2.0 cm; applying a dielectric structure having a plurality of layers on the substrate; depositing a photoresist; exposing the photoresist to a grating pattern; developing the photoresist to produce the grating pattern in the photoresist; and reactive ion etching to transfer the grating pattern to the dielectric structure.

In another embodiment, the invention may be characterized as a multilayer diffraction grating comprising: a substrate having a thickness of at least 2.0 cm; a dielectric structure including a plurality of layers formed on the; and a grating pattern formed in a surface of the dielectric structure using reactive ion etching.

BRIEF DESCRIPTION OF THE DRAWINGS

The above and other aspects, features and advantages of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary and preferred embodiments.

Figure 2:
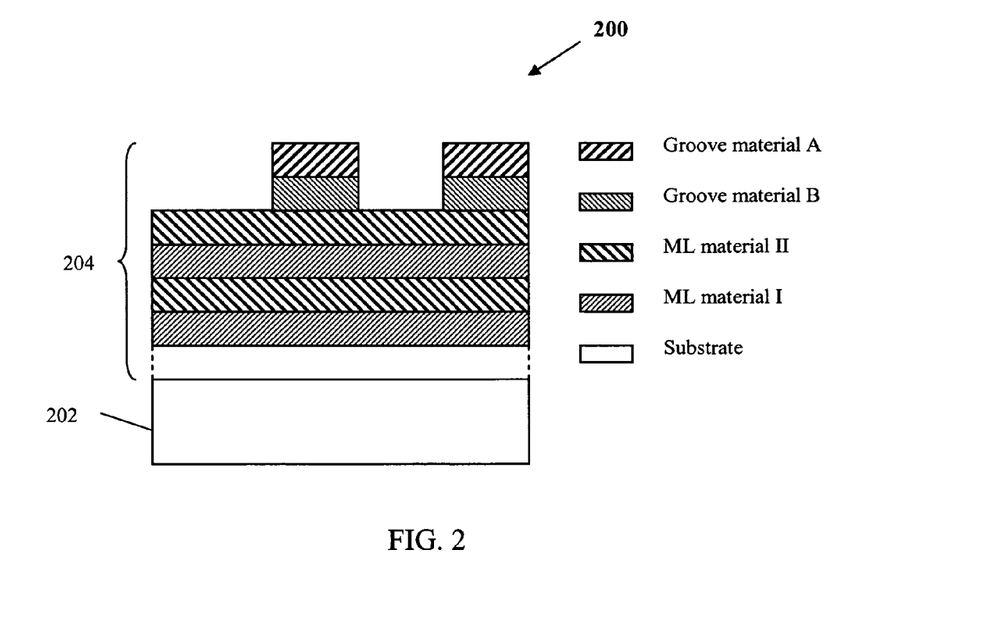
FIG. 2 is a diagram of a large multilayer diffraction grating formed with a thick substrate in accordance with one embodiment of the invention.

Referring first to FIG. 2, a diagram is shown of a large multilayer diffraction grating formed with a thick substrate in accordance with one embodiment of the invention. The multilayer diffraction grating 200 includes a substrate 202 having a multilayer dielectric structure 204 formed thereon. The multilayer dielectric structure 204 includes several layers of dielectric material, for example, having alternating indexes of refraction and is also referred to as a dielectric stack. For example, illustrated are multilayer (ML) material I and multilayer (ML) material II. It is understood that the multilayer structure 204 may have any number of desired layers (as illustrated by dashed lines extending from the dielectric structure 204 to the substrate 202). Furthermore, the top layer/s of the multilayer structure 204 have the diffraction grating structure patterned thereon (shown in cross section). For example, lines of grooves are etched into the top layer/s of the multilayer dielectric structure. It is noted that the top two layers are illustrated as groove material A and groove material B, although it is understood that these materials may be the same as ML material I and ML material II or be different dielectric materials. Any suitable dielectric material may be used. The grating 200 is preferred to be a large grating requiring that the substrate 202 is a thick substrate such as required for high peak power, high energy lasers, such as the petawatt class laser. Thus, as used herein, a large scale, size or area substrate is generally referred to a substrate having a diameter (or dimension perpendicular to the thickness of the substrate) of at least 12 cm, and more preferably at least 15 cm. In preferred form, the substrate is generally circular in shape or disc-like. Furthermore, as used herein, a thick substrate refers to a substrate that is at least 2.0 cm thick, and more typically, at least 2.5 cm thick, as opposed to thin substrates, which are defined to be less than 1 cm thick, and more typically, less than 0.5 cm thick. It is noted that the illustrations of FIGS. 2, 3A-3F and 5 (as described below) are not necessarily drawn to scale.

As described above, according to known fabrication techniques for multilayer diffraction gratings, insulating materials, such as fused silica (glass), are predominantly used as the substrate material. Such materials are routinely polished to optical quality and have good adherence to the oxide dielectric layers formed thereon.

However, several problems occur when the grating requires a thick substrate when using reactive ion etching (RIE). One problem with large scale gratings having thick, dielectric substrates is their large thermal resistance or low thermal conductivity. As the ions strike the top surface during the reactive ion etching, they transfer a large amount of kinetic energy to the surface. This energy is deposited as heat at the surface and can be represented by a surface heat flux, q". This heat flux must be conducted through the substrate according to Fourier's law, $$q'' = -k \partial T / \partial x$$

where k is the thermal conductivity of the substrate material. A one-dimensional treatment of heat transfer is acceptable in this case since the diameter of the substrate, D is much greater than its thickness, d, and the incident heat flux, q", is approximately uniform. Under steady-state conditions, the temperature of the substrate throughout the substrate is given by, $$T(x) - T_0 = q'' x / k$$

where, $T_0$ is the temperature of the bottom of the substrate (x=0), which is assumed to be held at a constant temperature. From this equation, the temperature of the surface which is subject to the ion flux, T(x=t) increases with both increasing thickness and decreasing thermal conductivity, k. According to current techniques for reactive ion etching of photoresist patterned surfaces, the surface temperature must be low (e.g., <20° C.) in order to achieve high etch selectivity between the photoresist mask and the base substrate. While this can be accomplished on thin (e.g., t is less than 1.0 cm), thermally insulating substrates, such as fused silica, it is not currently possible on thick (t is at least 2 cm) substrates required for large scale diffraction gratings. The cooling approach of U.S. Pat. No. 5,296,091 Bartha et al. would help, but due to the poor thermal conductivity of the substrate, this method becomes increasingly harder as the substrate thickness gets larger.

Another, more severe, problem with reactive ion etching of large gratings having a thick substrate is that in order for reactive ion etching to work effectively, the DC bias voltage must provide a sufficient voltage drop from the electrode underneath the substrate in order to ensure the proper ion acceleration towards the surface. Thus, the substrate should be sufficiently thin. The capacitance of the substrate is given by, $$C = \epsilon A/d$$

where d is the thickness of the substrate, $\epsilon$ is the dielectric constant of the substrate material, and A is the area of the substrate. Similarly, the conductivity of the substrate, $\delta$ is given by $$\delta = 1/(\rho d)$$

where $\rho$ is the resistivity of the substrate material. Since the dielectric substrates employed in most known approaches are insulators, they exhibit a low conductivity and low dielectric constant, $\epsilon$. The voltage drop between the bottom of the substrate (at the cathode) and the top (where the RIE plasma strikes the surface), $\Delta V$, is given by, $$\Delta V = d/C = (\rho_s/\epsilon) d^2$$

This problem is made more severe as the thickness of the substrate is increased such that the dielectric constant is reduced to that approaching its value in vacuum, $\epsilon_0$. Therefore, if the substrate is made from a thick material with a significant resistivity, the effective DC bias voltage (the voltage differential between the top surface of the substrate and the anode) is significantly reduced due to an increased voltage drop across the substrate.

One possible solution to this problem is to increase the bias voltage at the cathode in order to compensate for the voltage drop. However, the voltage drop must be increased considerably for thick substrates in order to match the DC bias voltage able to be achieved on a thin substrate, the associated electrical isolation requirements dictates a much more complex RIE system than currently available. Increasing the power will further accentuate heating effects in the substrates, leading to more severe problems. Without a high DC bias, the RIE process cannot be utilized and the resulting etch will not have sufficient quality to etch the sub-micron features required by this application.

After much effort, due to these problems, Applicants have been unable to use reactive ion etching for the fabrication of a large scale multilayer diffraction grating having a thick substrate with acceptable quality and performance using conventional materials and fabrication techniques.

According to several embodiments of the invention and in order to overcome the problems described above with large multilayer diffraction gratings having thick substrates, a different substrate material is selected for fabrication using reactive ion etching. In preferred embodiments, an electrically conductive material that can serve as an adequate base layer for a multilayer dielectric coating is selected. In other words, a material is used that has a low electrical resistivity and a high thermal conductivity, which aids in the RIE process. Furthermore, the substrate material should have good mechanical properties. Since the multilayer film on the surface has very high reflectivity, there is a negligible amount of light that is transmitted to the substrate. Thus, in order to support a multilayer dielectric structure 204, in one embodiment, the substrate 202 has a flat, polishable surface. Known insulating materials such as silica, are not effective due to relatively high electrical resistivity and low thermal conductivity as described above, and metallic substrates have good electrical properties but do not provide a good base material for the multilayer dielectric structure to attach.

There are a number of possible materials that meet these requirements. Several embodiments use semi-metallic or metalloid materials, such as semiconductor materials, e.g., silicon materials. In some embodiments, the semi-metallic material is a material that has been doped with another element to lower the electrical resistivity of the material as is well understood in the art, while in other embodiments, the semi-metallic material is not doped. For example, silicon doped with boron has a 0.05-0.2 Ohm/cm bulk resistivity, which is 10-15 orders of magnitude lower than silica (glass), has a high thermal conductivity of about 150 W/m-K (watts/meter-Kelvin), is strong and is easily polished to give a flat profile suitable for multilayer dielectric deposition. Other viable materials include those used in the semiconductor industry and doped Silicon Carbide. For example, depending on the doping, Silicon Carbide has an electrical resistivity between about 0.1-0.01 Ohm/cm and a thermal conductivity of about 400 W/m-K.

Figure 5:
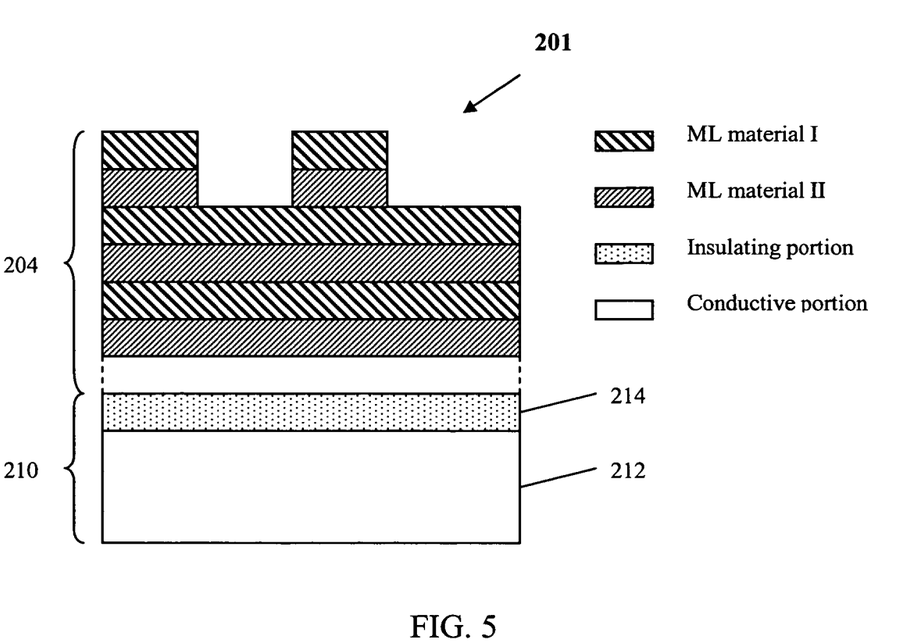
FIG. 5 is a diagram of a large multilayer diffraction grating formed with a thick substrate in accordance with another embodiment of the invention.

In alternative embodiments, another substrate option is to use a composite substrate made of different material layers, such as illustrated in FIG. 5. In the embodiment of FIG. 5, the multilayer diffraction grating 201 includes a composite substrate 210 comprising a conductive substrate 212 (also referred to as a conductive portion), such as a metallic (including alloys) semi-metallic or semiconductor material, and a thin dielectric or insulating layer 214 (also referred to as an insulating portion) formed, deposited, coated or bonded to the conductive substrate 212. For example, in one implementation, the insulating layer 214 is a thin glass membrane that is attached to a thicker conductive substrate 212 that has a matched thermal coefficient of expansion to prevent separation or stressing of the membrane layer during thermal cycling. This composite substrate 210 would satisfy the etching requirements, since the thickness of the material with poor conductivity (i.e., the insulating layer 214) is thin and the thicker base material (i.e., the conductive substrate 212) has good electrical and thermal conductivity. In a specific example, the conductive portion 212 is a low thermal expansion alloy, such as the well known nickel-iron alloy INVAR, and the insulating portion 214 is Borosilicate Glass. The thickness of the conductive portion 212 relative to the insulating portion 214 will depend on the implementation, although generally it is preferred the thickness of the conductive portion 212 be at least 75% of the overall thickness of the composite substrate 210.

Thus, accordingly, in preferred embodiments, the substrate material/s is/are selected such that the substrate 202/210 has an electrical resistivity preferably less than 0.2 Ohm/cm and a thermal conductivity of preferably at least 100 W/m-K. In other words, in preferred form, whether the substrate is a bulk material or a composite substrate, the choice of substrate material/s is selected based on the etching process used, reactive ion etching.

Reactive ion etching of photoresist patterned materials deposited on semiconductor substrates of course forms the basis of integrated circuit fabrication and there is substantial prior art associated with both methods and structures, e.g., U.S. Pat. No. 4,426,440, issued to Thompson (which is incorporated herein by reference). However, the substrate for integrated circuit devices is specifically designed for very thin components (less than 1 mm) and the choice of semiconductor substrates was due to the desire to incorporate the electrical properties of the substrate into the integrated circuit. That is, the choice of substrate material for integrated circuits has nothing to do with the specific type of etching technique used. Indeed, the issues of substrate temperature and electrical resistance of the substrate are irrelevant to the reactive ion etching of integrated circuits since the substrates are so thin.

In contrast, the choice of substrate material according to several embodiments of the invention is dependent on the etching technique and that large gratings having thick substrates (at least 2 cm) are required due to the application.

Furthermore, some semi-metallic materials (such as semiconductor materials) are known to have a better mechanical rigidity than silica based materials. For example, the Young's modulus of silicon is approximately twice that of fused silica. Thus, in order to provide the same mechanical stiffness as a silica substrate, many semi-metallic substrates can be made slightly thinner, reducing the overall amount of materials used. Thus, the grating can be made slightly smaller than conventional thick substrate gratings.

Figure 3A:
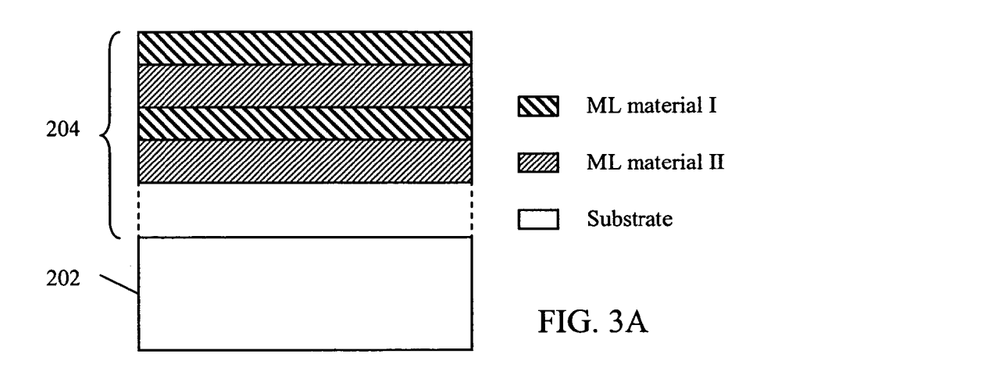
FIGS. 3A-3F are diagrams illustrating the fabrication of a multilayer diffraction grating in accordance with several embodiments of the invention.
Figure 3B:
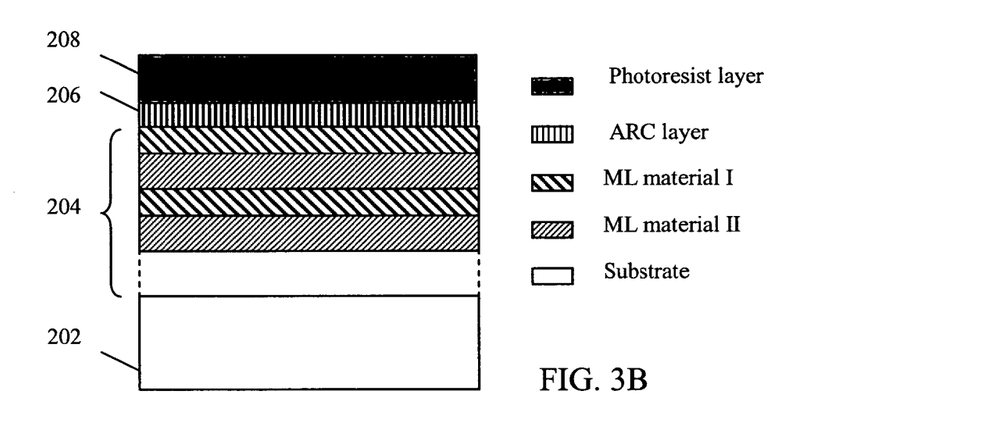
Figure 3C:
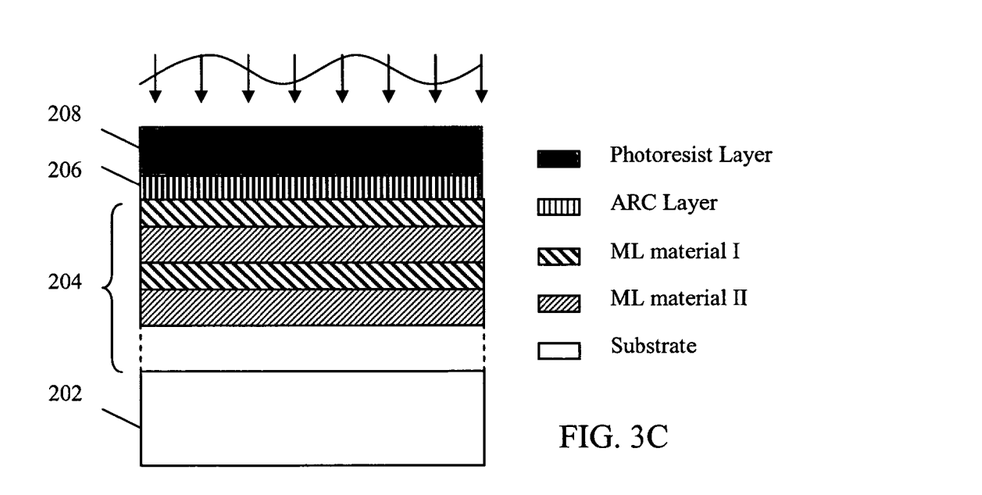
Figure 3D:
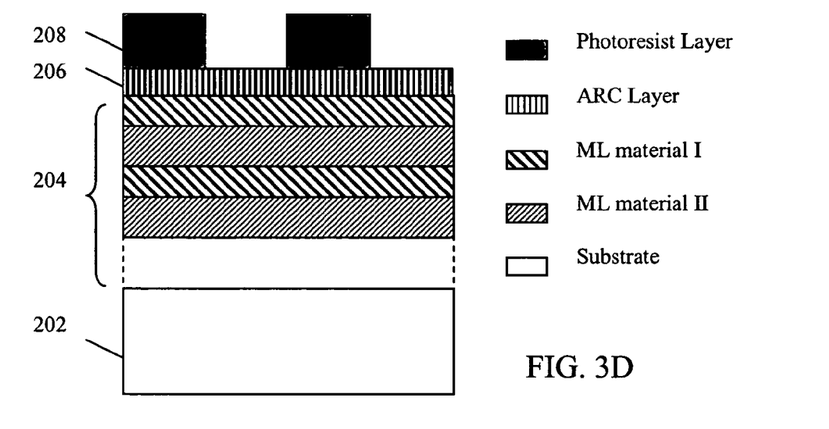
Figure 3E:
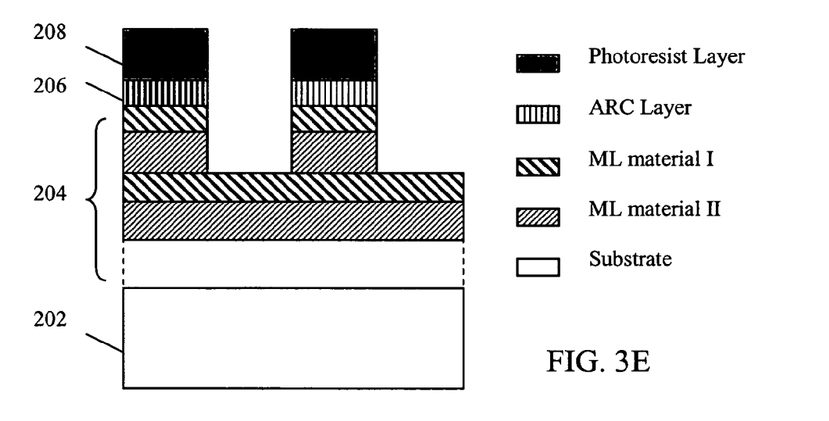
Figure 3F:
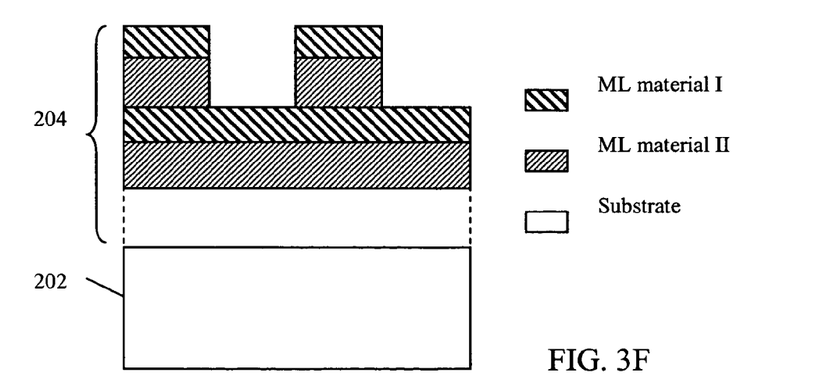
Figure 4:
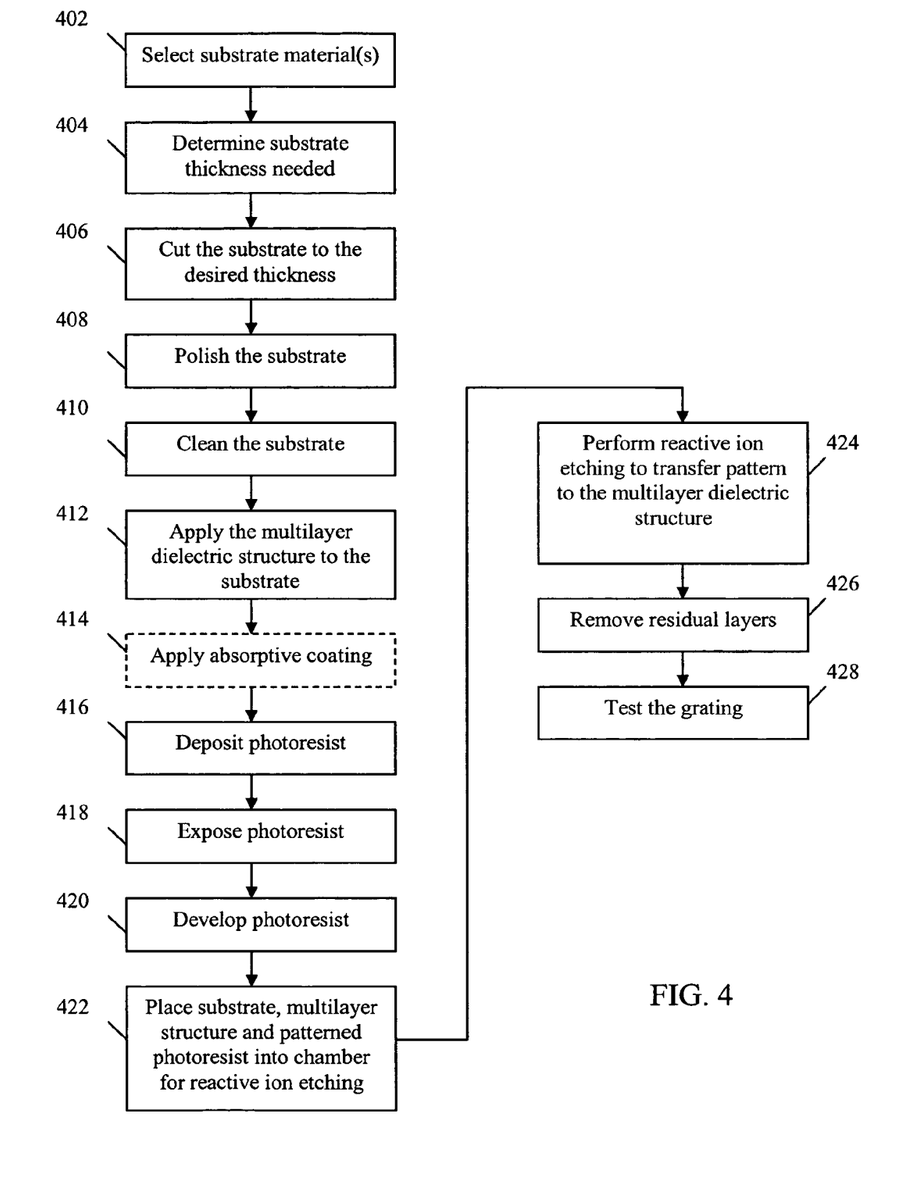
FIG. 4 is a flowchart illustrating the steps performed according to several embodiments of the invention.

The following describes a fabrication method according to several embodiments of the invention, which is also illustrated in the flowchart of FIG. 4. Concurrent reference is also made to FIGS. 3A-3F.

1) Select the proper material/s for the multilayer diffraction grating substrate 202 or 210 (Step 402). The material(s) are selected based on their performance using reactive ion etching in the application with a thick (at least 2.0 cm) substrate. Thus, the material is selected such that the substrate 202/210 has a low electrical resistivity and a high thermal conductivity. In preferred embodiments, the substrate has an electrical resistivity less than 0.2 Ohm/cm and a thermal conductivity of at least 100 W/m-K. Additionally, the material should serve as an adequate base layer for a multilayer dielectric coating. For example, a semi-metallic material (including semiconductor materials that may be doped or not), such as Silicon doped with boron is selected. As an alternative, a composite substrate 210 such as illustrated in FIG. 5 including a conductive portion 212 (e.g., a metallic (including metal alloys) or semi-metallic material) with a thin insulating layer portion 214 (e.g., silica) formed thereon is selected.

2) Calculate the thickness of the substrate 202/210 required (Step 404) to provide sufficient mechanical stiffness to produce the desired surface quality upon the stresses applied in the use of the grating. According to several embodiments for large scale multilayer diffraction gratings, the thickness will be at least 2.0 cm, preferably at least 2.5 cm. In preferred embodiments, the substrate will generally have a 6:1 (diameter:thickness) aspect ratio. In one example, the substrate is 15 cm in diameter and 2.5 cm thick, while in another example, the semiconductor substrate is 30 cm in diameter and 5.0 cm thick.

3) Cut the substrate to the desired thickness (Step 406). In the event a composite substrate 210 is to be used, generally, the conductive substrate 212 is cut to the desired thickness, then the dielectric or insulating layer 214 is applied onto the conductive substrate 212 (e.g., by bonding, gluing, depositing or coating) as is well known in the art to provide the desired substrate thickness.

4) Polish the substrate to the desired surface quality (Step 408) using techniques well known in the art. In the event a composite substrate 210 is used, the insulating layer 214 is polished.

5) Clean the substrate (Step 410) prior to deposition of dielectric coating materials.

6) Apply the desired dielectric coating materials to form the multilayer dielectric structure 204 to the substrate (Step 412) by means known in the art such as ion sputtering, electron beam evaporation, ion assisted deposition, etc. This is illustrated in FIG. 3A, the multilayer dielectric structure 204 or stack including multilayer (ML) materials I and II. It is understood that the dielectric structure 204 may include any number of layers of different dielectric materials indicated by dashed lines connecting the stack to the substrate. Additionally, it is noted that in some embodiments, the top layers that will eventually form the grooves of the grating pattern comprise a different dielectric material than other layers in the stack, such as shown in FIG. 2.

7) In some cases, it may be necessary to apply an absorptive coating or layer on top of the dielectric layers (optional Step 414, see ARC layer 206 of FIG. 3B) prior to photoresist deposition listed in Step 416 below. Such an absorptive layer is referred to as an anti-reflective coating (ARC) at the exposure wavelength. This is generally due to the fact that a multilayer coated silicon substrate has significant reflectivity at the exposure wavelength such that it is desired to prevent the exposure wavelength from reaching the silicon substrate.

8) Deposit the photoresist 208 in the desired thickness on top of the dielectric layers or on top of the optional absorptive coating layer 206 (Step 416, see also FIG. 3B). The photoresist 208 may be deposited by any number of conventional techniques such as spin or meniscus coating.

9) Expose the photoresist 208 to the pattern desired in surface relief (Step 418, see FIG. 3C). Such exposure may be by proximity printing, projection or interferometric exposure to light of sufficient short wavelength to activate the photoresist, as is known in the art.

10) Develop the photoresist 208 to produce a free-standing surface relief pattern in the exposed photoresist (Step 420, see FIG. 3D), as known in the art.

11) Place the substrate containing the dielectric layers and the patterned photoresist into a chamber designed for reactive ion etching (Step 422). The fixture within the chamber should be designed such that the bottom of the substrate is in intimate contact with the cathode and the top surface of the substrate extends closer to the anode within the chamber than any other object within the plasma volume.

12) Perform reactive ion etching according to standard techniques in the industry for the material to be etched and the depth of etching in order to transfer the surface relief pattern in the photoresist to the dielectric layers (Step 424, see FIG. 3E). These techniques include choice of etch material, DC voltage bias applied to the bottom of the substrate and length of etch time required. As described above, since the substrate material has been selected to have a low electrical resistivity (e.g., less than 0.2 Ohm/cm) and a high thermal conductivity (e.g., at least 100 W/m-K), the bias voltage is sufficient to ensure proper ion acceleration without the need for voltage compensation and the generated heat is sufficiently removed during the etching without additional cooling. Thus, the bias voltage is not lowered due to voltage drop across the thick substrate (as would be in a silica based thick substrate) and heat generation is not problematic. Reactive ion etching is well understood in the art and is described above with reference to FIG. 1.

13) Upon completion of the pattern transfer into the desired dielectric layer, remove any residual layers such as the absorptive layer using established techniques in the art such as a wet etch or oxygen plasma etch (Step 426, see FIG. 3F).
14) Test the quality and efficiency of the wavefront in the diffracted order of the resulting grating as desired (Step 428).

The resulting multilayer diffraction grating pattern formed in the top surface of the multilayer dielectric structure 204 appears similar to that illustrated in FIGS. 2 and 5. The grooves in the top layer/s of the grating are periodically-spaced (typically sub-micron in size). The unpatterned layer is a highly reflecting coating at the desired wavelength of light to be used. This reflecting layer could be a multilayer thin-film reflector that is comprised of two or more dielectric materials of different refractive index. The grooves are comprised of one or more dielectric materials. The base substrate is polished to have an optically smooth surface. It is noted that the top layers of the grating are the same as the other layers of the multilayer dielectric structure or stack in the embodiments of FIGS. 3A-3F; however, it is understood that these layers may comprise different dielectric material, such as that illustrated in FIG. 2.

It is understood that while in preferred embodiments of the invention where the multilayer diffraction grating substrate is thick (at least 2 cm), semi-metallic (e.g., semiconductor) substrates, or composite substrates having conductive and insulating portions, as described herein may also be used for fabricating multilayer diffraction gratings which have substrates of any size and having any thickness, including substrates that are considered small scale and thin (e.g., less than 1 cm) in the art. Furthermore, although preferred embodiments of the invention are directed to multilayer diffraction gratings for use with high peak power lasers, such as petawatt class lasers, such diffraction gratings may be useful for other applications, such as high average power lasers.

DESIGN EXAMPLE

In one example, boron-doped silicon was selected as the substrate for a new multilayer diffraction grating with a period of 1480 lines/mm (675 nm). The diffraction performance was modeled using a rigorous coupled-wave code and the layer depths were constrained so that the top layer of the dielectric structure was silica. The thickness of the top layer was varied so that, if it was processed to form lamellar grooves of approximately 50% duty cycle, a grating with high diffraction efficiency grating in the $-1^{st}$ diffraction order was produced.

Spin coating is also difficult for large diameter substrates because the weight of the substrate is problematic when spin speeds of greater than 3000 rpm must be achieved. Instead, meniscus coating was used where the substrate is held upside down on a vacuum chuck and leveled with respect to a liquid-filled linear coating head, with a precise gap between the head and the substrate that allows the liquid flowing form the head to touch the substrate, but not the head itself. The head is then moved at a constant speed underneath the substrate. As it moves the liquid flows onto the part, and as long as the speed of the head is constant, the liquid layer remaining on the substrate has a constant thickness. The coating thickness is inversely proportional to the speed to the two-thirds power of the coating head.

The multilayer dielectric coated substrate is then coated with the ARC layer and the photoresist layer, with baking cycles to soft bake the coatings. A sub-micron UV line pattern is exposed into the photoresist using a interferometric exposure system, where a highly coherent, collimated UV laser beam is split into two and interfered with itself at the correct angular offset to produce straight fringes of the desired period. The part is then wet developed to produce the groove pattern in the top photoresist layer.

Using thick silicon substrates as the base, etch recipes were developed in order to successfully fabricate the MLD gratings, incorporating etching of silica and polyimide (ARC material) layers. The etching recipes are characterized by placing thin silicon wafers coated with the material to be etched on the surface over the chamber, covered in quadrants and the edges and the center. The parameters of the etch process were altered until all of the desired characteristics were satisfied.

The substrate is now etched, with recipes designed to remove the exposed ARC layer and then the top silica layer, using the photoresist as a mask. After this process, the photoresist and remaining ARC is removed in order to produce a multilayer dielectric grating with the desired properties.

While the invention herein disclosed has been described by means of specific embodiments and applications thereof, numerous modifications and variations could be made thereto by those skilled in the art without departing from the scope of the invention set forth in the claims.

What is claimed is:

1. A method of making a multilayer diffraction grating comprising:
    providing a substrate having a thickness of at least 2.0 cm;
    applying a dielectric structure having a plurality of layers on the substrate;
    depositing a photoresist;
    exposing the photoresist to a grating pattern;
    developing the photoresist to produce the grating pattern in the photoresist; and
    reactive ion etching to transfer the grating pattern to the dielectric structure.

2. The method of claim 1 wherein the substrate comprises a semi-metallic material.

3. The method of claim 2 wherein the semi-metallic material comprises a semiconductor material.

4. The method of claim 3 wherein the semiconductor material comprises boron doped silicon.

5. The method of claim 1 wherein the substrate comprises a material having an electrical resistivity of less than 0.2 Ohm/cm and a thermal conductivity of at least 100 W/m-K.

6. The method of claim 5 wherein the material has an electrical resistivity of less than 0.05 Ohm/cm.

7. The method of claim 1 wherein the substrate comprises a composite substrate including a conductive portion and an insulating portion.

8. The method of claim 1 further comprising forming the substrate by:
    providing a conductive substrate;
    applying an insulating material to the conductive substrate.

9. The method of claim 1 wherein the substrate has a thickness of at least 2.5 cm.

10. The method of claim 1 wherein the substrate has a width substantially perpendicular to the thickness of at least 12 cm.

11. The method of claim 1 further comprising:
    selecting a material for the substrate based on the performance of the material as the substrate when used with reactive ion etching.

12. The method of claim 1 further comprising:
depositing an absorptive coating onto the dielectric structure;
wherein the depositing the photoresist step comprises depositing the photoresist onto the absorptive coating.

13. A multilayer diffraction grating comprising:
a substrate having a thickness of at least 2.0 cm;
a dielectric structure including a plurality of layers formed on the substrate; and
a grating pattern formed in a surface of the dielectric structure using reactive ion etching.

14. The grating of claim 13 wherein the substrate comprises a semi-metallic material.

15. The grating of claim 14 wherein the semi-metallic material comprises a semiconductor material.

16. The grating of claim 15 wherein the semiconductor material comprises boron doped silicon.

17. The grating of claim 13 wherein the substrate comprises a material having an electrical resistivity of less than 0.2 Ohm/cm and a thermal conductivity of at least 100 W/m-K.

18. The grating of claim 17 wherein the material has an electrical resistivity of less than 0.05 Ohm/cm.

19. The grating of claim 13 wherein the substrate comprises a composite substrate including a conductive portion and an insulating portion.

20. The grating of claim 13 wherein the substrate has a thickness of at least 2.5 cm.

21. The grating of claim 13 wherein the substrate has a width substantially perpendicular to the thickness of at least 12 cm.

* * * * *